United States Patent [19]

Temme

[11] 3,902,591

[45] Sept. 2, 1975

[54] DEVICE FOR INTERCONNECTING CHAINS AND SCRAPER ELEMENTS OF SCRAPER CHAIN CONVEYORS

[75] Inventor: Helmut Temme, Waltrop, Germany

[73] Assignee: Gewerkschaft Eisenhutte Westfalia, Westphalia, Germany

[22] Filed: Nov. 20, 1972

[21] Appl. No.: 308,109

[30] Foreign Application Priority Data
Nov. 25, 1971 Germany............................ 2158477

[52] U.S. Cl. .............................................. 198/175
[51] Int. Cl.[2]......................................... B65G 19/24
[58] Field of Search ........... 198/171, 172, 173, 174, 198/175, 176, 168

[56] References Cited
FOREIGN PATENTS OR APPLICATIONS

| | | | |
|---|---|---|---|
| 902,709 | 8/1962 | United Kingdom................. | 198/175 |
| 1,558,183 | 1/1969 | France................................ | 198/172 |
| 1,264,324 | 3/1968 | Germany ........................... | 198/172 |
| 531,924 | 10/1954 | Belgium............................. | 198/175 |

Primary Examiner—Evon C. Blunk
Assistant Examiner—Jeffrey V. Nase
Attorney, Agent, or Firm—Thompson, Birch, Gauthier & Samuels

[57] ABSTRACT

A locking device for interconnecting the chains and scraper elements of scraper chain conveyors.

The device is in the form of an open shackle with a closed transverse bow adjoining spaced-apart parallel branches provided with aligned borings for securing a scraper element. The bow has circular cross section transition zones adjoining the branches and these zones have transverse oppositely disposed first inner surfaces, which are concave in plan view, and also form shallow depressions over their upper sides for positive location with the links of chain sections. The material is reinforced at the junctures between these zones and the branches. An arcuate concave second inner surface merges with these transverse first inner surfaces and there is a similar outer end surface arcuately convex inplan view and complementary to said second inner surface.

2 Claims, 2 Drawing Figures

DEVICE FOR INTERCONNECTING CHAINS AND SCRAPER ELEMENTS OF SCRAPER CHAIN CONVEYORS

BACKGROUND TO THE INVENTION

This invention relates to a locking device for interconnecting the chains and scraper elements of scraper chain conveyors.

Such devices are well known in the mining art and have a variety of configurations; usually with two parallel limbs or branches for receiving a scraper element therebetween and a closed end portion adjoining these branches.

It is known, for example from German Utility Model No. 1,738,188 to shape the transverse inner faces of this end portion to positively locate the links of the associated sections of chain. The inner end face of the end portion may be rectilinear in plan view, as shown in German Pat. No. 1,158,000; and adjoined to these chain-link engaging transverse faces.

An end portion of trapezoidal form is also known from German Pat. No. 1,810,873. This serves to reduce the material in selected zones and thereby allows expansion during operation which in turn improves the durability of the device.

From the foregoing the invention seeks to provide an improved device. More particularly, an object of the invention is to improve the breaking strength and particularly the permanent loading strength of the device. A further object is to achieve such improvement by the adoption of simple measures.

Another object of the invention is by appropriate shaping to reduce the accumulation of material in the end portion of the device as far as possible since excessive material has an adverse effect from the points of view of strength and of the heat treatment of the device during manufacture. Another object is to ensure that the operational stresses can be taken up as favourably as possible.

SUMMARY OF THE INVENTION

It has been found that the operational characteristics of the device can be improved to a remarkable extent in an extremely simple manner, if the end portion of the device is, in accordance with the invention, constructed with a regularly concave inner curvature, as seen in plan view, in the lateral zone between two arcuate chain link locating faces.

The invention thus comprises providing the end portion with oppositely disposed first inner surfaces which are concave in plan view and serve for location with the links of chains and a second inner surface which is also concave in plan view and extends between said first inner surfaces to be smoothly merged therewith at junctures, the center of the second inner surface being offset in plan view from a transverse line interconnecting said junctures.

Detailed tests have shown that particularly satisfactory breaking strength and permanent loading characteristics can be obtained if in accordance with a further feature of the invention the offset distance, i.e., the distance between the end of the radius of the concave chain-link engaging first inner surfaces and the center of the concave second inner surface does not exceed 10% and is preferably 8–10% of the pitch of the device. The pitch of the device is the maximum distance between the concave first inner surfaces locating the chain links. Owing to the consequential reduction in the quantity of material on the inside of the end portion the elasticity of the device is increased in this zone, so that the permitted expansion undergone by the end portion of the device under the stresses occurring in operation is likewise increased. Indeed the elasticity and expansion of the device at this end portion can be more closely adapted to that occurring on the side on which the device is connected up to the scraper element. Also the material reduction allows improved heat treatment. To ensure that the expansion in the end portion of the device is not increased beyond the permissible rate, generally about 1.8%, while at the same time enabling the expansion taking place in the said portion to be largely coordinated with that occurring at the chain connection zones, the said offset distance should be less than 10% of the pitch of the device and should not exceed this figure.

It is also advisable for the concave second inner surface to be in the form of a circular arc in plan view described between the ends of the radii of the two chain link engaging first inner surfaces. The center of curvature of this arc is preferably situated at or near the intersection between a longitudinal plane extending centrally between the branches of the device and a transversal axis perpendicular to this plane and interconnecting the centers of borings in the branches of the device serving to receive a connection bolt securing the scraper element.

The transverse external contour of the end portion of the device will likewise preferably take the form of a circular arc in plan view with its center of curvature at or near the intersection between the aforesaid longitudinal central plane and a transverse line which interconnects the centers of curvature of the chain link-engaging first inner surfaces.

According to a further preferred feature of the invention the thickness of the end portion of the device, measured along the longitudinal plane, is less than half the pitch and is preferably about 30–40% thereof. It is also advisable to make the radius of curvature of the chain link-engaging surfaces somewhat less than one quarter of the said pitch, preferably about 10–20% thereof.

It is also of advantage for the device to have a reinforced cross section on the upper side at the juncture between each of the branches and the transition zones in which the chain links are located. In these transition zones the material is preferably of circular cross-section, while the branches are preferably rectangular in lateral view and in cross section.

The invention may be understood more readily and various other aspects, features and advantages of the invention may become apparent from consideration of the following description.

BRIEF DESCRIPTION OF DRAWING

An embodiment of the invention will now be described, by way of example only, with reference to the accompanying drawing, wherein.

DESCRIPTION OF PREFERRED EMBODIMENT

Figure 1:
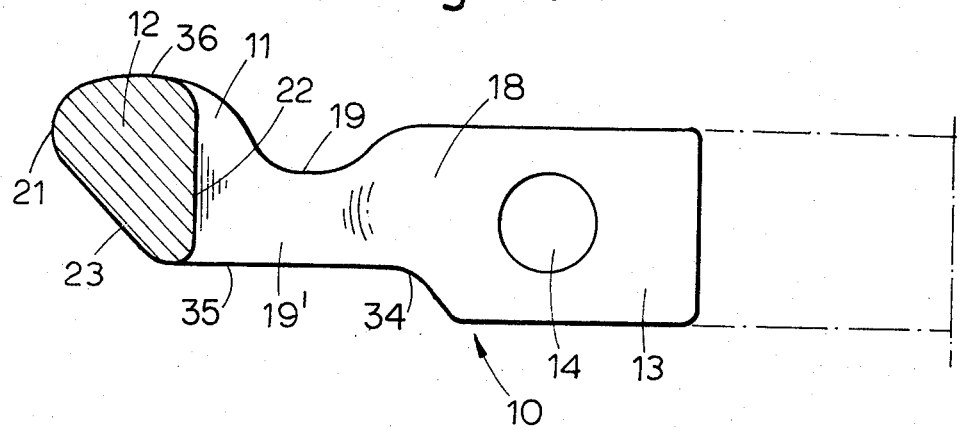
FIG. 1 is a part-sectional elevational view of a device made in accordance with the invention.

The device generally denoted 10 is formed by drop forging and preferably heat treated. As shown, the device 10 has two parallel branches 13 adjoined by an end portion 11 of generally curvilinear or arcuate form. The branches 13, having inner surfaces 30 and outer surfaces 31, enable an end part of a scraper element 15 to be received therebetween. These branches 13 have borings 14 therein which can be aligned with a boring in the scraper element 15 to enable the latter to be secured to the device with the aid of a bolt 16 and nut 17.

The upper end face of the portion 11 is provided with increased material forming a projection or beading 12 serving as a reinforcement and also to guide the device within the channels formed by side walls of the conveyor. The branches 13 are rectangular in side view and cross-section. The material is thickened at the junctions or zones 18 between the upper part of each of the branches 13 and the adjacent zone of the portion 11.

The end portion 11 is basically a loop or bow of material adjoining the rear ends of branches 13 and having a generally elliptical external profile. The material of the portion 11 has a circular cross-section over transition zones 19 extending between the branches 13 and the remainder of the portion 11. These zones 19 are designed to locate the end most oval links of chain sections. More particularly, each of the zones 19 form a shallow depression (FIG. 1) at the upper side of the device and has a concave first inner surface 19, in plan view (FIG. 2) at the laterally inner sides of the device. An oval link of a chain section is shown in FIG. 2 in chain-dotted outline and is designated 20. The radius of curvature of the concave surfaces 19' matches that of the links so that the latter can be snugly located as shown in FIG. 2. Each first inner surface 19' has a mid-point 32.

The end portion 11 has an outer convex end surface 21, having a mid-point 33, and shaped, in plan view, as an arc of a circle generally over a lateral distance $t$, representing the maximum distance between the first inner surfaces 19' and known as the pitch of the device. This arc is symmetrically located since it has its center of curvature at point M which lies at the intersection between the longitudinal central plane of the device —extending between the branches 13— and the transverse plane Q interconnecting the centers of curvature of the first inner surfaces 19'. The outer surface 21 smoothly joins the rear ends of parallel branch outer surfaces 31 at second juncture points 34.

The end portion 11 also has a second inner end surface 22 which is similarly shaped in plan view as an arc of a circle. This second inner surface 22 is planar in side view and smoothly merges with the first inner surfaces 19' at first junctures 19''. The center of curvature of the second inner surface 22 is at a point $M_2$ which lies at the intersection between the longitudinal central plane of the device and the common axis of the borings 14.

The end portion 11 also has convex third inner surfaces 37, in plan view (FIG. 2), at the laterally inner sides of the device. Each third inner surface 37 smoothly joins the front end of one of the first inner surfaces 19' with the rear end of one of the parallel branch inner surfaces 30.

The mid-point T of the second inner surface 22, which is located at the maximum distance from the point M, is offset by a distance $a$ from a line denoted S interconnecting the first junctures 19'' and extending nominally tangentially to the links of the chain sections connected to the device. Preferably the distance $a$ does not exceed 10% of the distance $t$ and is more preferably in the range 8 – 10% of the distance $t$. Also it is preferred that the thickness of the end portion 11 between the surfaces 21, 22, distance $c$, is not greater than 50%, more preferably 30 – 40%, of the distance $t$. Furthermore the distance $b$ between the transverse axis Q and the line S interconnecting the junctures 19'', i.e., the radius of curvature of the surfaces 19' is preferably less than 25% of the distance $t$, and more preferably 10 – 20% of the distance $t$.

Figure 2:
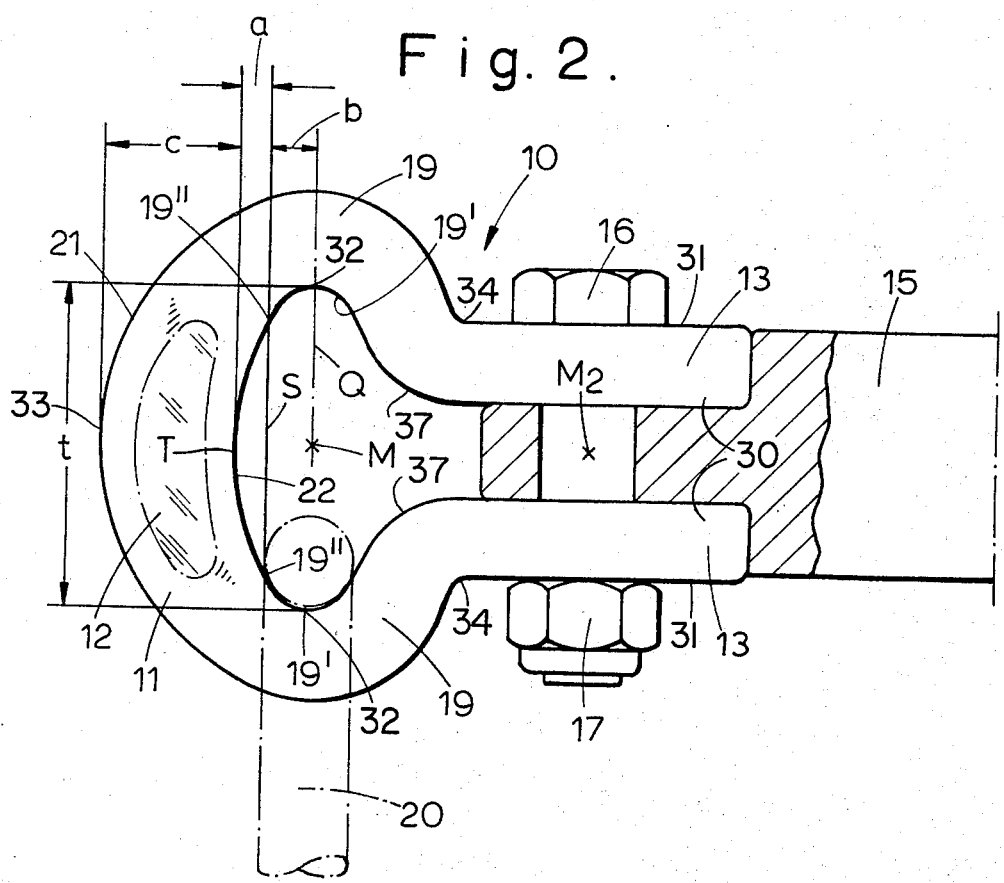
FIG. 2 is a plan view of the device shown in FIG. 1.

Referring to FIG. 1, it will be seen that end portion 11 has a lower surface 35 which is horizontal and smoothly joins the bottom of second inner surface midpoint T and the second juncture points 34. The second inner surface 22 has a substantially vertical face and is rounded at the top and bottom thereof. A beveled surface 23 extends upwardly and rearwardly from the rounded bottom of the second inner surface 22 and is planar. Finally, a convex upper surface 36 smoothly joins the rounded top of second inner surface 22 with the upper end of the beveled surface 23.

It has been found that a device constructed as aforesaid has considerably improved strength and operational characteristics and yet the production of the device is relatively simple and inexpensive.

I claim:

1. In a device for use in scraper chain conveyors to interconnect two chain links and a scraper element, said device having two longitudinally extending spaced-apart parallel branches defining a space therebetween for receiving and mounting a scraper element therein, and an approximately C-shaped end portion joining the adjacent rear ends of said branches, the improvement therein comprising:

a. said parallel branches each having an inner surface and an outer surface, both said surfaces being substantially planar and being substantially parallel to each other, said parallel branches having transverse aligned borings therein for receiving a bolt to secure a scraper element to the device;

b. said end portion having two laterally spaced-apart oppositely disposed first inner surfaces which are concave in plan view and which serve to locate and stabilize the two chain links, each said first inner surface having a mid-point along its length;

c. said end portion having a second inner surface which is concave and has the form of an arc of a circle in plan view and which smoothly joins the rear ends of said oppositely disposed first inner surfaces at first juncture points, said second inner surface being free of convex portions along its length, said second inner surface having a mid-point along its length, the center of curvature of said second inner surface being disposed at the intersection of the axis of said borings and the longitudinal plane of said second inner surface mid-point;

d. said end portion having two laterally spaced-apart oppositely disposed third inner surfaces which are convex in plan view, each said third inner surface smoothly joining the front end of one of said first inner surfaces with the rear end of one of said parallel branch inner surfaces, said third inner surfaces being free of concave portions along their lengths;

e. said end portion having an outer surface which is convex and has the form of an arc of a circle in plan view and which smoothly joins the rear ends of said parallel branch outer surfaces at second juncture points, said outer surface being free of concave portions along its length, said outer surface having a mid-point along its length, the center of curvature of said outer surface being disposed at the intersection of a line drawn between said first inner surface mid-points and the longitudinal plane of said outer surface mid-point;
f. said second inner surface mid-point being longitudinally spaced in plan view from a line drawn through said first juncture points by a distance which is in the range of 8% to 10% of the distance between said first inner surface mid-points;
g. a line drawn between said first inner surface mid-points being longitudinally spaced in plan view from a line drawn between said first juncture points by a distance which is in the range of 10 to 20% of the distance between said first inner surface mid-points;
h. said second inner surface mid-point being longitudinally spaced in plan view from said outer surface mid-point by a distance which is in the range of 30 to 40% of the distance between said first inner surface mid-points;
i. said end portion having a lower surface which is substantially horizontal in elevation between said second inner surface mid-point and said second juncture points;
j. said second inner surface being substantially vertical in elevation and being rounded at the top and bottom thereof;
k. said end portion having a beveled surface which is straight in elevation and which is angled upwardly and rearwardly from the rounded bottom of said second inner surface; and
l. said end portion having an upper surface which is convex in elevation and which smoothly joins the rounded top of said second inner surface with the upper end of said beveled surface.

2. A device according to claim 1 wherein said branches are substantially rectangular in elevation.

* * * * *